US012006887B2

(12) United States Patent
Staykov et al.

(10) Patent No.: US 12,006,887 B2
(45) Date of Patent: Jun. 11, 2024

(54) MIXED FUEL ENGINE

(71) Applicant: Innovative Fuel Systems Ltd., Edmonton (CA)

(72) Inventors: Peter Staykov, Whiterock (CA); Daniel Ivan Handford, Edmonton (CA); Curtis Figley, Edmonton (CA); Andrei Chichak, Edmonton (CA)

(73) Assignee: Innovative Fuel Systems Ltd., Edmonton (CA)

( * ) Notice: Subject to any disclaimer, the term of this patent is extended or adjusted under 35 U.S.C. 154(b) by 0 days.

(21) Appl. No.: 17/772,051

(22) PCT Filed: Oct. 28, 2020

(86) PCT No.: PCT/CA2020/051444
§ 371 (c)(1),
(2) Date: Apr. 26, 2022

(87) PCT Pub. No.: WO2021/081639
PCT Pub. Date: May 6, 2021

(65) Prior Publication Data
US 2022/0381191 A1    Dec. 1, 2022

Related U.S. Application Data

(60) Provisional application No. 62/927,223, filed on Oct. 29, 2019.

(51) Int. Cl.
*F02D 19/06* (2006.01)
*F02D 19/08* (2006.01)
(Continued)

(52) U.S. Cl.
CPC ......... *F02D 19/081* (2013.01); *F02D 19/061* (2013.01); *F02D 19/0642* (2013.01);
(Continued)

(58) Field of Classification Search
CPC ............... F02D 19/061; F02D 19/0642; F02D 19/0647; F02D 19/066; F02D 19/081
(Continued)

(56) References Cited

U.S. PATENT DOCUMENTS 6,145,494 A    11/2000   Klopp
6,640,773 B2   11/2003   Ancimer et al.
(Continued)

FOREIGN PATENT DOCUMENTS

CA    2969373 A1 *   6/2016   ........... F02D 19/061
CA    2969373 A1     6/2016
(Continued)

OTHER PUBLICATIONS

Volpato, O., Theunissen, F., and Mazara, R., "Control System for Diesel—Compressed Natural Gas Engines", SAE international, Sep. 2006.
(Continued)

*Primary Examiner* — Erick R Solis
(74) *Attorney, Agent, or Firm* — Kimberly A Peaslee; KPIP Law, PLLC

(57) ABSTRACT

A system, method and circuit restricts the amount of a first fuel being provided to a duel-fuel engine, for example a diesel-natural gas engine; wherein a secondary circuit is provided, in parallel, to the circuit formed between the engine control unit, first fuel injector, and ground comprising a dummy load, and a normally closed switch inserted in the first fuel injection circuit; such that when the normally open switch is in a closed state the dummy load provides a resistance to the second sub-circuit, such that a total resistance in the second sub-circuit is equal to a total resistance in the first sub-circuit when the normally closed switch is in a closed state.

23 Claims, 5 Drawing Sheets

(51) Int. Cl.
*F02D 41/20* (2006.01)
*F02D 41/40* (2006.01)

(52) U.S. Cl.
CPC ......... *F02D 19/0692* (2013.01); *F02D 41/20* (2013.01); *F02D 41/402* (2013.01); *F02D 2200/0614* (2013.01)

(58) Field of Classification Search
USPC ..................................... 123/27 GE, 525, 526
See application file for complete search history.

(56) References Cited

U.S. PATENT DOCUMENTS

| | | | |
|---|---|---|---|
| 6,675,748 B2 | 1/2004 | Ancimer et al. | |
| 6,694,242 B2 | 2/2004 | Wong | |
| 7,222,015 B2 | 5/2007 | Davis et al. | |
| 7,444,986 B2 | 11/2008 | Shute | |
| 7,685,997 B2 | 3/2010 | Zanotti et al. | |
| 7,712,451 B2 | 5/2010 | Hung et al. | |
| 7,730,872 B2 | 6/2010 | Leone et al. | |
| 7,913,673 B2 | 3/2011 | Vanderslice et al. | |
| 8,161,946 B2 * | 4/2012 | Pursifull | F02D 41/3094 701/114 |
| 8,463,528 B2 | 6/2013 | Cologna | |
| 8,936,009 B2 | 1/2015 | Puckett et al. | |
| 9,188,069 B2 | 11/2015 | Steffen | |
| 9,249,745 B2 | 2/2016 | Watkins et al. | |
| 9,518,517 B2 | 12/2016 | Kawabe et al. | |
| 9,587,568 B2 | 3/2017 | Joshi | |
| 9,752,515 B1 * | 9/2017 | Stroup | F02D 41/0025 |
| 9,790,905 B2 | 10/2017 | Katagata et al. | |
| 9,869,278 B2 * | 1/2018 | Schwark | F02M 21/0281 |
| 10,161,318 B2 | 12/2018 | Stroup | |
| 10,767,611 B2 | 9/2020 | Meek et al. | |
| 2012/0085326 A1 | 4/2012 | Mo et al. | |

FOREIGN PATENT DOCUMENTS

| | | |
|---|---|---|
| DE | 202012100107 | 3/2012 |
| EP | 1255033 A2 | 11/2002 |
| GB | 2372835 | 9/2002 |
| GB | 2468539 | 9/2010 |
| KR | 101320414 B1 | 6/2013 |

OTHER PUBLICATIONS

Extended European Search Report for 20880421.1, dated Nov. 8, 2023.

* cited by examiner

MIXED FUEL ENGINE

FIELD

The present discussion pertains to the field of mixed-fuel engines, and in particular, controlling the injection of a secondary fuel to replace a portion of a primary fuel in the mixed-fuel engine.

BACKGROUND

Given the pollution and other environmental issues associated with the operations of gasoline and diesel oil fueled internal combustion engines, there is a desire to utilize those fuel types less, replacing them with more environmentally advantageous combustion fuels. One example of a more environmentally advantageous combustion fuel is natural gas, otherwise known as methane, and as such is an attractive target for replacement of gasoline or diesel in internal combustion engines. Natural gas is known to produce less pollutants following combustion, reducing the expenditure of fossil fuel reserves, as well as reducing the costs of the engine operating costs. Even more preferable, is the use of natural gas in combination with diesel, in pre-existing internal combustion engines, thereby reducing operation cost while maintaining the ability to use an existing and well-established engine system.

Dual fuel engines use a primary fuel and at least one secondary fuel, are known in the art; and provide many advantages over a single fuel engine. Commonly known are those engines designed to use diesel as the primary fuel, with liquid petroleum gas, or compressed natural gas as the secondary fuel. The primary fuel is often used at low engine loads, with the secondary fuel introduced as engine cylinder temperatures increases or load increases, with the secondary fuel often of lower cost, decreased combustion pollutants, as well as improving combustion of the primary fuel thereby providing the opportunity for reduced particulates in the atmosphere following combustion.

The prior art has described engines designed to incorporate a primary and secondary fuel (a "native engine"), though there are significant advantages to adapting an existing engine to accept a secondary fuel in the combustion reaction; which is often referred to as a retro-fit engine. Regardless of whether it is a native or retro-fit engine, the art describes the use of an Electronic Control Unit (ECU) which monitors and manages the engine systems, which on a diesel engine can include fuel injector valves, fuel pumps, cam and crank shaft position, and engine temperature. For dual fuel engines, the ECU can be installed by the Original Equipment Manufacturer (OEM), or may be replaced as part of the retro-fit adaptation of the engine, or even still the adaptation of an engine to become a dual fuel engine may add an additional ECU to the engine, which operates in concert and communication with the OEM ECU.

SUMMARY

In one aspect, there is provided a mixed-fuel control circuit comprising a fuel injector; an Engine Control Unit; a Normally Open switch, a Normally Closed switch, a ground, a mixed-fuel control unit, and a dummy load; wherein at least one of the Normally Open switch and Normally Closed switch are in electrical communication with, and under the control of, the mixed-fuel control unit; the Normally Open switch and Normally Closed switch are maintained in opposing open and dosed states; the mixed-fuel control circuit further comprises a first and second sub-circuit, each of the first and second sub-circuits originating with the Engine Control Unit and terminating with the ground, the first sub-circuit and second sub-circuit being wired in parallel; the first sub-circuit comprising the fuel-injector with a Normally Closed switch in series and interposed between the Engine Control Unit and ground; the second sub-circuit comprising the dummy load with a Normally Open switch in series and interposed between the Engine Control Unit and ground; and when the Normally Open switch is in a closed state the dummy load provides a resistance to the second sub-circuit, such that the total resistance in the second sub-circuit is equal to the total resistance in the first sub-circuit when the Normally Open switch is in a closed state.

In another aspect, there is provided a method for controlling delivery of fuel to a mixed-fuel engine utilizing a first and second fuel, the method comprising providing an electronic control unit; a first fuel line in fluid communication with the mixed-fuel engine and a first storage tank; a second fuel line in fluid communication with the mixed-fuel engine and a second storage tank; and a mixed-fuel control circuit comprising a fuel injector; a Normally Open switch, a Normally Closed switch, a ground, a mixed-fuel control unit, and a dummy load; wherein, at least one of the Normally Open switch and Normally Closed switch are in electrical communication with, and under the control of, the mixed-fuel control unit; the Normally Open switch and Normally Closed switch are maintained in opposing open and closed states; the mixed-fuel control circuit further comprises a first and second sub-circuit, each of the first and second sub-circuits originating with the Engine Control Unit and terminating with the ground, the first sub-circuit and second sub-circuit being wired in parallel; the first sub-circuit comprising the fuel-injector with a Normally Closed switch in series and interposed between the Engine Control Unit and ground; the second sub-circuit comprising the dummy load with a Normally Open switch in series and interposed between the Engine Control Unit and ground; when the Normally Open switch is in a closed state the dummy load provides a resistance to the second sub-circuit, such that the total resistance in the second sub-circuit is equal to the total resistance in the first sub-circuit when the Normally Closed switch is in a closed state; the amount of the first fuel delivered to the mixed-fuel engine via a first fuel line is reduced by operation of the Normally Open switch from the open state to the closed state; and while the Normally Open switch is in the closed state, a second fuel is introduced into the mixed-fuel engine via a second fuel line, the amount of second fuel introduced being equal in combustion energy to the amount of the first fuel reduced.

In another aspect, there is provided a mixed-fuel engine system utilizing a first and second fuel, the mixed-fuel engine system comprising an engine, a first storage tank for a first fuel, a second storage tank for a second fuel, a first fuel line in fluid communication with the engine and the first storage tank, a second fuel line in fluid communication with the engine and the second storage tank, and a mixed-fuel control circuit comprising; a fuel injector, an Engine Control Unit, a Normally Open switch, a Normally Closed switch, a ground, a mixed-fuel control unit, and a dummy load; wherein at least one of the Normally Open switch and Normally Closed switch are in electrical communication with, and under the control of, the mixed-fuel control unit; the Normally Open switch and Normally Closed switch are maintained in opposing open and closed states; the mixed-fuel control circuit further comprises a first and second sub-circuit, each of the first and second sub-circuits originating with the Engine Control Unit and terminating with the ground, the first sub-circuit and second sub-circuit being wired in parallel; the first sub-circuit comprising the fuel-injector with a Normally Closed switch in series and interposed between the Engine Control Unit and ground; the second sub-circuit comprising the dummy load with a Normally Open switch in series and interposed between the Engine Control Unit and ground; when the Normally Open switch is in a closed state the dummy load provides a resistance to the second sub-circuit, such that the total resistance in the second sub-circuit is equal to the total resistance in the first sub-circuit when the Normally Closed switch is in a dosed state; the amount of the first fuel delivered to the mixed-fuel engine via a first fuel line is reduced by operation of the Normally Open switch from the open state to the closed state; and while the Normally Open switch is in the closed state, a second fuel is introduced into the mixed-fuel engine via a second fuel line, the amount of second fuel introduced being equal in combustion energy to the amount of the first fuel reduced.

In another aspect, there is provided a method to convert a diesel engine with a fuel injector under the control of and interposed between an engine control unit and ground, and a first diesel fuel line in fluid communication with a first fuel injector, to a mixed-fuel engine comprising, to the circuit formed by the engine control unit, the fuel injector and the ground providing a second circuit, wired in parallel, creating a first and second sub-circuit, respectively, the second sub-circuit comprising a Normally Open switch and a dummy load in electrical communication with a mixed-fuel control unit, introducing into the first sub-circuit a Normally Closed switch interposed between the engine control unit and ground, providing a second storage tank for a second fuel, providing a second fuel line in fluid communication with the engine and the second storage tank; and wherein at least one of the Normally Open switch and Normally Closed switch are in electrical communication with, and under the control of, the mixed-fuel control unit; the Normally Open switch and Normally Closed switch are maintained in opposing open and closed states; when the Normally Open switch is in a closed state the dummy load provides a resistance to the second sub-circuit, such that the total resistance in the second sub-circuit is equal to the total resistance in the first sub-circuit when the Normally Closed switch is in a closed state; the amount of a first fuel delivered to the mixed-fuel engine via a first fuel line is reduced by operation of the Normally Open switch from the open state to the closed state; and while the Normally Open switch is in the dosed state, a second fuel is introduced into the mixed-fuel engine via the second fuel line, the amount of second fuel introduced being equal in combustion energy to the amount of the first fuel reduced.

In another aspect, there is provided a secondary fuel control system for a mixed-fuel engine, comprising a detector configured to detect a fuel injection event signal arising from an Engine Control Unit, a lookup table coupled to the detector and configured to determine the energy equivalent of fuel being provided to the engine by way of the fuel injection event signal; a secondary fuel equivalent module coupled to the lookup table and configured to calculate an amount of a secondary fuel having an energy equivalent to the predetermined amount of primary fuel by calculating an energy value of the predetermined amount of primary fuel, calculating the amount of secondary fuel needed to provide the energy equivalent, and activating a mixed-fuel control circuit for a period of time sufficient to reduce the amount of first fuel provided to the engine and introduce an amount of secondary fuel needed to provide the energy equivalent, the mixed-fuel control circuit comprising a fuel injector, an Engine Control Unit; a Normally Open switch, a Normally Closed switch, a ground, a mixed-fuel control unit, and a dummy load; wherein at least one of the Normally Open switch and Normally Closed switch are in electrical communication with, and under the control of, the mixed-fuel control unit; the Normally Open switch and Normally Closed switch are maintained in opposing open and closed states; the mixed-fuel control circuit further comprises a first and second sub-circuit, each of the first and second sub-circuits originating with the Engine Control Unit and terminating with the ground, the first sub-circuit and second sub-circuit being wired in parallel; the first sub-circuit comprising the fuel-injector with a Normally Closed switch in series and interposed between the Engine Control Unit and ground; the second sub-circuit comprising the dummy load with a Normally Open switch in series and interposed between the Engine Control Unit and ground; when the Normally Open switch is in a dosed state the dummy load provides a resistance to the second sub-circuit, such that the total resistance in the second sub-circuit is equal to the total resistance in the first sub-circuit when the Normally Closed switch is in a closed state; the amount of the first fuel delivered to the mixed-fuel engine via a first fuel line is reduced by operation of the Normally Open switch from the open state to the closed state; and while the Normally Open switch is in the closed state, a second fuel is introduced into the mixed-fuel engine via a second fuel line, the amount of second fuel introduced being equal in combustion energy to the amount of the first fuel reduced.

According to another aspect, there is provided a mixed-fuel rail control circuit comprising a fuel rail pump, an Engine Control Unit, a Normally Open switch, a Normally Closed switch, a ground, a mixed-fuel rail control unit, and a dummy load; wherein at least one of the Normally Open switch and Normally Closed switch are in electrical communication with, and under the control of, the mixed-fuel rail control unit; the Normally Open switch and Normally Closed switch are maintained in opposing open and closed states; the mixed-fuel rail control circuit further comprises a first and second sub-circuit, each of the first and second sub-circuits originating with the Engine Control Unit and terminating with the ground, the first sub-circuit and second sub-circuit being wired in parallel; the first sub-circuit comprising the fuel rail pump with a Normally Closed switch in series and interposed between the Engine Control Unit and ground; the second sub-circuit comprising the dummy load with a Normally Open switch in series and interposed between the Engine Control Unit and ground; and when the Normally Open switch is in a closed state the dummy load provides a resistance to the second sub-circuit, such that the total resistance in the second sub-circuit is equal to the total resistance in the first sub-circuit when the Normally Closed switch is in a closed state.

According to another aspect, there is provided a method for controlling delivery of fuel to the diesel fuel rail of a mixed-fuel engine utilizing diesel fuel and second fuel, the method comprising providing an electronic control unit, a diesel fuel line in fluid communication with the diesel fuel rail and a first storage tank; a second fuel line in fluid communication with the mixed-fuel engine and a second storage tank; and a mixed-fuel rail control circuit comprising a fuel rail pump, a Normally Open switch, a Normally Closed switch, a ground, a mixed-fuel control unit, and a dummy load; wherein at least one of the Normally Open switch and Normally Closed switch are in electrical communication with, and under the control of, the mixed-fuel control unit; the Normally Open switch and Normally Closed switch are maintained in opposing open and closed states; the mixed-fuel rail control circuit further comprises a first and second sub-circuit, each of the first and second sub-circuits originating with the Engine Control Unit and terminating with the ground, the first sub-circuit and second sub-circuit being wired in parallel; the first sub-circuit comprising the fuel rail pump with a Normally Closed switch in series and interposed between the Engine Control Unit and ground; the second sub-circuit comprising the dummy load with a Normally Open switch in series and interposed between the Engine Control Unit and ground; when the Normally Open switch is in a closed state the dummy load provides a resistance to the second sub-circuit, such that the total resistance in the second sub-circuit is equal to the total resistance in the first sub-circuit when the Normally Closed switch is in a dosed state; and the amount of diesel fuel delivered to a fuel rail is reduced by operation of the Normally Open switch from the open state to the closed state.

According to another aspect, there is provided a mixed-fuel engine system utilizing diesel and a second fuel, the mixed-fuel engine system comprising an engine, a first storage tank for diesel, a second storage tank for a second fuel, a first diesel fuel line in fluid communication with the engine and the first storage tank by way of a fuel rail, a second fuel line in fluid communication with the engine and the second storage tank; and a mixed-fuel rail control circuit comprising a fuel rail pump, an Engine Control Unit, a Normally Open switch, a Normally Closed switch, a ground, a mixed-fuel control unit, and a dummy load; wherein at least one of the Normally Open switch and Normally Closed switch are in electrical communication with, and under the control of, the mixed-fuel control unit; the Normally Open switch and Normally Closed switch are maintained in opposing open and closed states; the mixed-fuel rail control circuit further comprises a first and second sub-circuit, each of the first and second sub-circuits originating with the Engine Control Unit and terminating with the ground, the first sub-circuit and second sub-circuit being wired in parallel; the first sub-circuit comprising the fuel rail pump with a Normally Closed switch in series and interposed between the Engine Control Unit and ground; the second sub-circuit comprising the dummy load with a Normally Open switch in series and interposed between the Engine Control Unit and ground; when the Normally Open switch is in a closed state the dummy load provides a resistance to the second sub-circuit, such that the total resistance in the second sub-circuit is equal to the total resistance in the first sub-circuit when the Normally Closed switch is in a closed state; the amount of the diesel fuel delivered to a fuel rail is reduced by operation of the Normally Open switch from the open state to the closed state.

According to another aspect, there is provided a secondary fuel control system for a mixed-fuel engine, comprising a detector configured to detect a fuel injection event signal arising from an Engine Control Unit, a detector configured to detect a signal arising from an Engine Control Unit which provides for a fuel pump event into a diesel fuel rail, a lookup table coupled to the detector and configured to determine the energy equivalent of fuel being provided to the engine by way of the fuel injection event signal; a secondary fuel equivalent module coupled to the lookup table and configured to calculate an amount of a secondary fuel having an energy equivalent to the predetermined amount of primary fuel by calculating an energy value of the predetermined amount of primary fuel, calculating the amount of secondary fuel needed to provide the energy equivalent, and activating a mixed-fuel control circuit for a period of time sufficient to reduce the amount of first fuel provided to the engine and introduce an amount of secondary fuel needed to provide substantially the same energy equivalent, the mixed-fuel control circuit comprising a fuel injector; an Engine Control Unit; a Normally Open fuel injector switch, a Normally Closed fuel injector switch, a ground, a mixed-fuel control unit, and a dummy load; a fuel rail pressure module coupled to a lookup table and configured to calculate the amount of diesel fuel not injected by reason of the action of the secondary fuel equivalent module, and activating a mixed-fuel rail control circuit for a period of time sufficient to reduce the amount of diesel fuel provided to the fuel rail so as to substantially maintain the fuel rail pressure; the mixed-fuel rail control circuit comprising a fuel rail pump, a Normally Open fuel rail switch, a Normally Closed fuel rail switch, a ground. a mixed-fuel control unit, and a dummy load; wherein at least one of the Normally Open fuel injector switch and Normally Closed fuel injector switch are in electrical communication with, and under the control of, the mixed-fuel control unit; the Normally Open fuel injector switch and Normally Closed fuel injector switch are maintained in opposing open and dosed states; the mixed-fuel control circuit further comprises a first and second sub-circuit, each of the first and second sub-circuits originating with the Engine Control Unit and terminating with the ground, the first sub-circuit and second sub-circuit being wired in parallel; the first sub-circuit comprising the fuel-injector with a Normally Closed fuel injector switch in series and interposed between the Engine Control Unit and ground: the second sub-circuit comprising the dummy load with a Normally Open fuel injector switch in series and interposed between the Engine Control Unit and ground; when the Normally Open fuel injector switch is in a closed state the dummy load provides a resistance to the second sub-circuit, such that the total resistance in the second sub-circuit is equal to the total resistance in the first sub-circuit when the Normally Closed fuel injector switch is in a closed state; the amount of the first fuel delivered to the mixed-fuel engine via a first fuel line is reduced by operation of the Normally Open fuel injector switch from the open state to the closed state; and while the Normally Open fuel injector switch is in the closed state, a second fuel is introduced into the mixed-fuel engine via a second fuel line, the amount of second fuel introduced being equal in combustion energy to the amount of the first fuel reduced; and wherein at least one of the Normally Open fuel rail switch and Normally Closed fuel rail switch are in electrical communication with, and under the control of, the mixed-fuel rail control unit; the Normally Open fuel rail switch and Normally Closed fuel rail switch are maintained in opposing open and closed states; the mixed-fuel rail control circuit further comprises a first and second sub-circuit, each of the first and second sub-circuits originating with the Engine Control Unit and terminating with the ground, the first sub-circuit and second sub-circuit being wired in parallel; the first sub-circuit comprising the fuel rail pump with a Normally Closed fuel rail switch in series and interposed between the Engine Control Unit and ground; the second sub-circuit comprising the dummy load with a Normally Open fuel rail switch in series and interposed between the Engine Control Unit and ground; and when the Normally Open fuel rail switch is in a closed state the dummy load provides a resistance to the second sub-circuit, such that the total resistance in the second sub-circuit is equal to the total resistance in the first sub-circuit when the Normally Closed fuel rail switch is in a closed state.

According to another aspect, there is provided a method to convert to a mixed-fuel engine a diesel engine with a fuel rail pump and a fuel injector both under the control of and interposed between an engine control unit and ground, and a first diesel fuel line in fluid communication with a first fuel injector by way of a diesel fuel rail, comprising; to the circuit formed by the engine control unit, the fuel injector and the ground, providing a second circuit, wired in parallel, creating a first and second fuel injector sub-circuit, respectively, the second fuel injector sub-circuit comprising a Normally Open fuel injector switch and a dummy load in electrical communication with a mixed-fuel control unit; introducing into the first fuel injector sub-circuit a Normally Closed fuel injector switch interposed between the engine control unit and ground, to the circuit formed by the engine control unit, the fuel rail pump and the ground, providing a second circuit, wired in parallel, creating a first and second fuel rail pump sub-circuit, respectively, the second fuel rail pump sub-circuit comprising a Normally Open fuel rail pump switch and a dummy load in electrical communication with a mixed-fuel control unit; introducing into the first fuel rail pump sub-circuit a Normally Closed fuel rail pump switch interposed between the engine control unit and ground, providing a second storage tank for a second fuel, providing a second fuel line in fluid communication with the engine and the second storage tank, and wherein at least one of the Normally Open fuel injector switch and Normally Closed fuel injector switch are in electrical communication with, and under the control of, the mixed-fuel control unit; the Normally Open fuel injector switch and Normally Closed fuel injector switch are maintained in opposing open and closed states; when the Normally Open fuel injector switch is in a closed state the dummy load provides a resistance to the second sub-circuit, such that the total resistance in the second sub-circuit is equal to the total resistance in the first sub-circuit when the Normally Closed fuel injector switch is in a closed state; the amount of a first fuel delivered to the mixed-fuel engine via a first fuel line is reduced by operation of the Normally Open fuel injector switch from the open state to the closed state; while the Normally Open fuel injector switch is in the closed state, a second fuel is introduced into the mixed-fuel engine via the second fuel line, the amount of second fuel introduced being substantially equal in combustion energy to the amount of the first fuel reduced; at least one of the Normally Open fuel rail pump switch and Normally Closed fuel rail pump switch are in electrical communication with, and under the control of, the mixed-fuel control unit; the Normally Open fuel rail pump switch and Normally Closed fuel rail pump switch are maintained in opposing open and closed states; and when the Normally Open fuel rail pump switch is in a closed state the dummy load provides a resistance to the second sub-circuit, such that the total resistance in the second sub-circuit is equal to the total resistance in the first sub-circuit when the Normally Closed fuel rail pump switch is in a closed state.

DETAILED DESCRIPTION

Figure 1:
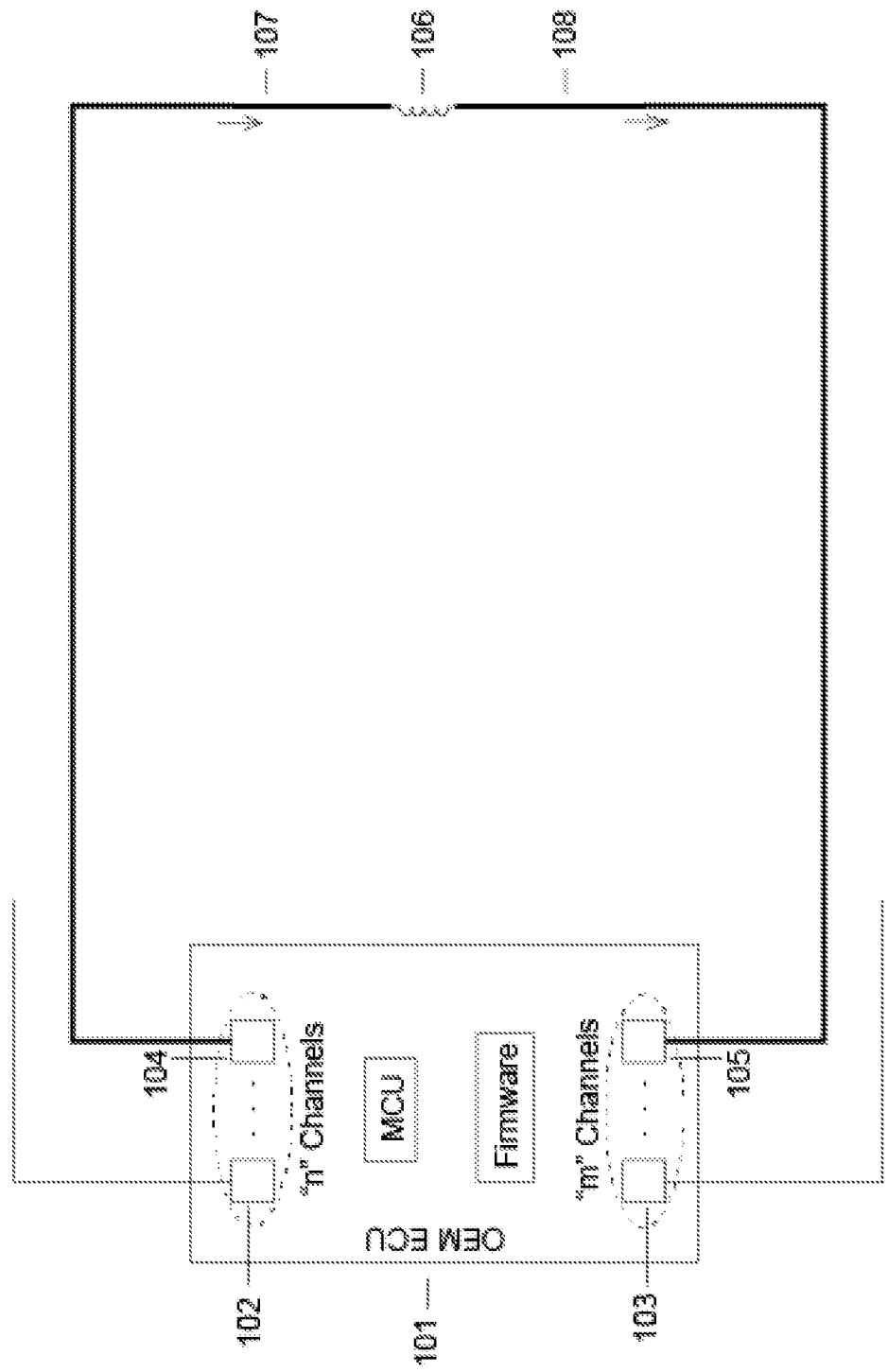
FIG. 1 shows a schematic of a standard diesel engine injector solenoid control system.

There will now be discussed a system, apparatus and circuit for application in a retrofit mixed-fuel internal combustion engine. A common type of mixed-fuel engine is a dual-fuel, compression-ignition engine, where ignition of the combustible fuel arising from compression, and with one of the fuels being diesel and the other being natural gas. The normal fueling process operating the cylinders of the Compression Ignition (CI) engine, is optionally, partially replaced by a significant proportion of hydrocarbon gas such as Compressed Natural Gas (CNG) such that the intended fuel energy content presented to each cylinder during co-fueling operation is substantially similar to the energy that would have otherwise been presented to the engine were it operating solely on the normal fueling process.

The discussion herein is in terms of diesel as a primary fuel and natural gas and a secondary fuel in a dual-fuel engine. It will be understood that the discussion may be adapted to other examples that use a different primary fuel, such as gasoline, and one or more different secondary fuels, in other types of internal combustion engines, such as spark-ignition engines.

As used herein, "ground" means an electrical reference return for the power, control and signal connections for the engine including, but not limited to the Engine Control Unit; which may also, but not necessarily, be at a common potential with the vehicle electrical system ground as a signal neutral or common reference.

As used herein, "equal", in the context of a total resistance of one circuit to another, includes dissimilar resistance between two circuits where the difference in resistance is insufficient to result in error state within the Engine Control Unit, a diagnostic fault message on the Engine Control Unit; or an error state or diagnostic fault message in a computing element in digital communication with the Engine Control Unit.

As used herein, "maintained in opposing open and closed states" means switches that are temporally and generally maintained in opposing states; but includes having both switches in a closed state contemporaneously, while transitioning the switches to opposing states.

It is contemplated that other combustible compressed gases or gas mixtures could also be used as the co-fuel candidate other than CNG (compressed natural gas). Other primary, or normal, fuels are capable of use with the system, apparatus, and circuits disclosed herein. The fuel used may require different fuel delivery systems as will be understood in the art.

By way of non-limiting example, if it is deemed that 50% co-fuel substitution is desired, the normally injected amount of diesel would be suppressed by 50% for a particular injection event, and a substantially energy equivalent would be delivered, comprising a volume of CNG provided to the cylinder prior to, and/or during, the associated intake cycle, such that the equivalent fuel energy available when the cylinder experiences its power cycle, is substantially similar to that which would have occurred with 100% of the normal fuel. Over time, and in sequence, this co-fuel substitution would be repeated on each cylinder, in turn, allowing for the engine to effectively operate on a blend of 50% diesel and 50% CNG energy content basis, by way of non-limiting example, as compared to the 100% diesel. This co-fuel operation mode provides advantages with respect to cost of operation, engine maintenance, fuel availability, emissions performance or other value propositions.

During engine operation, the delivery, timing and relative amount of each fuel type that is provided to the cylinders of the CI engine, in order to reliably implement the co-fueling operations is described herein, in the context of employing a supplementary control and fuel delivery system configured and installed on an otherwise traditionally equipped and controlled CI engine. This co-fueling controller (CFC) is arranged such that the Original Equipment Manufacturer (OEM) provided Engine Control Module (ECM) does not need to alter its basic functionality or behaviour, is otherwise allowed to operate independently without affecting the co-fueling operation, and in a one example the OEM ECM operates absent any need for direct communication with the CFC. Ideally, in a retrofit situation, the OEM ECM should not detect any diesel substitution.

Other implementation scenarios are contemplated; wherein the functional and control aspects of apparatus, system or circuit could be arranged within an OEM ECM and could operate in conjunction with existing OEM ECM functions and mechanisms. This level of equipment integration is contemplated, although in one example, the apparatus, system and circuit may be present in a retrofit application. In a retrofit application it is advantageous for the co-fueling to operate substantially invisible to the OEM ECM and otherwise allow the OEM ECM to control the engine operation as in a traditional single fuel scenario.

On a cylinder-to-cylinder and crankshaft rotation-to-rotation basis, the intended open times and close times of the diesel fuel injectors is detected, as generated by the OEM ECM. There are various known approaches to detect a crankshaft position, including inductive sensors, Hall Effect sensors, magnetoresistive sensor, optical sensors and galvanic sensors. These injector opening and closing times, in combination with timely measurements or other knowledge of the fuel rail pressure derived from the vehicle, relate directly to the amount of diesel fuel that the OEM ECM deemed necessary to provide each engine cylinder to meet the engine load demand in its usual fashion. Furthermore, in the case where a fraction of the diesel fuel is to be replaced with a secondary fuel, accurate time based suppression of the incoming diesel fuel pulses is required to trim out a predictable fraction of the diesel fuel, hence knowledge of and reaction to the timing of the OEM ECM injection on a fine time scale is required.

In many situations compression ignition engine injectors behave as electromagnetically actuated solenoid valves, or alternately using hydraulics controlled through a solenoid actuated pilot valve that directs high pressure fluid from the fuel rail to open and close the injector. Other types of injectors may be actuated by alternative mechanisms such as a piezoelectric drives, proportioning solenoids or other fuel injector know in the art. The opening and closing times of such injectors can be assessed by monitoring the actuator control signals, often through the real-time currents or voltages operating the injector actuators or through intermediate components that can be characterized accurately in terms of the flow versus the temporal behaviour of the drive signals. In one non-limiting embodiment, a schematic of a typical engine operating case is presented in FIG. 1, wherein the instant current drive provided by the OEM ECM to operate a fuel injector is monitored and measured by this system and method. Current controlled injectors are commonly available on diesel engine equipment heavy vehicles.

It is possible to simplify the fuel flow through an injector as being substantially gated by the ON time of the associated drive signals: notwithstanding that fuel injectors typically have measurable and non-trivial opening and closing times wherein the instant fuel flow through the injector develops, or extinguishes, in a non-linear fashion during opening and closing. Although there are non-linear response fluid flow and injector responses to change in current, in practice these can be modeled or characterized for particular engines and engine conditions such that appropriate corrections may be applied, to appropriately relate the measured open and close times to the amount of fuel passed. Also, in many cases the salient control signal for an injector is a current drive waveform provided to a magnetic solenoid actuator, in which case the control current produced by the OEM ECM can be conveniently measured by a galvanically isolated Hall effect current sensor such as one from the Melexis 91210 series, or through other known devices.

The present discussion contemplates other mechanisms to detect the OEM ECM intended injection timing; which include monitoring techniques such as inductive pickups or shunt monitors, interpreting drive voltage waveforms operating the injector actuators, detecting acoustical signatures characteristic of fuel flow through Doppler techniques, directly measuring the instant injector fuel flow, or other devices that exist or may be developed that would indicate the open and close operation of the injector or equivalently the fuel flow profile as delivered by the injector. Further, other actuator control signals are contemplated, including stepped or pulse width modulated drives, proportional analogue coils or others that will have their own behaviors as known in the art. These alternative implementations could be employed without materially affecting the application of system, apparatus and circuit discussed herein.

FIG. 1 shows an example of a diesel, single fuel, injection system. OEM ECM, 101, controls a multiplicity of high side drivers, in this exemplary case high-side drivers 102 and 104, and a multiplicity of low side sinks, in this exemplary case low-side sinks 103 and 105. Connected between the low-side sinks, 103 and 105, are injector solenoid coils, with FIG. 1 showing a single injector solenoid coil 106, which control the fuel injector actuation (not shown); with the exemplary injector solenoid coil in electrical communication with high-side driver 104 through wire 106 and to low-side sink 105 through wire 107. Various arrangements of such drivers 102 and 104, and sinks 103 and 105, are known to the art, but one common method is to provide multiple high side drivers and a multiple low side sinks to reduce system complexity through multiplexing. In these schemes, any given high side driver, for example 102 generates a voltage or current that passes through one of several injector solenoids (one solenoid represented by 106), the specific injector solenoid being determined by which low side sink is enabled. Other solenoid injectors operating from a common high side driver are inactive since that solenoid injector's corresponding low side driver is inactive. Commonly in a 6-cylinder engine configuration, there will be two high side drivers and three low side sinks, allowing six independent diesel solenoid injectors to be actuated. It is often the case that in addition to directing the timing of the high side driver(s) and low side sinks the OEM ECM is also measuring and adjusting the output of the drivers during the course of the injector actuation pulse to effect real time drive strength regulation through various approaches know to the art. Therefore any methodology or apparatus implemented to a single fuel engine system, intended to modify the actuation pulses independently of the OEM ECM, must do so in such a fashion as to not defeat or confuse the OEM ECM signal monitoring and regulation of the drive pulses, otherwise the OEM ECM may detect these disturbances as a fault in the system. Prior art has had to address this through the implementation of a new ECM or placement of an additional ECM that generates false signals to the OEM ECM, effectively mimicking normal engine operation, so as to avoid fault codes in the OEM ECM.

Figure 5:
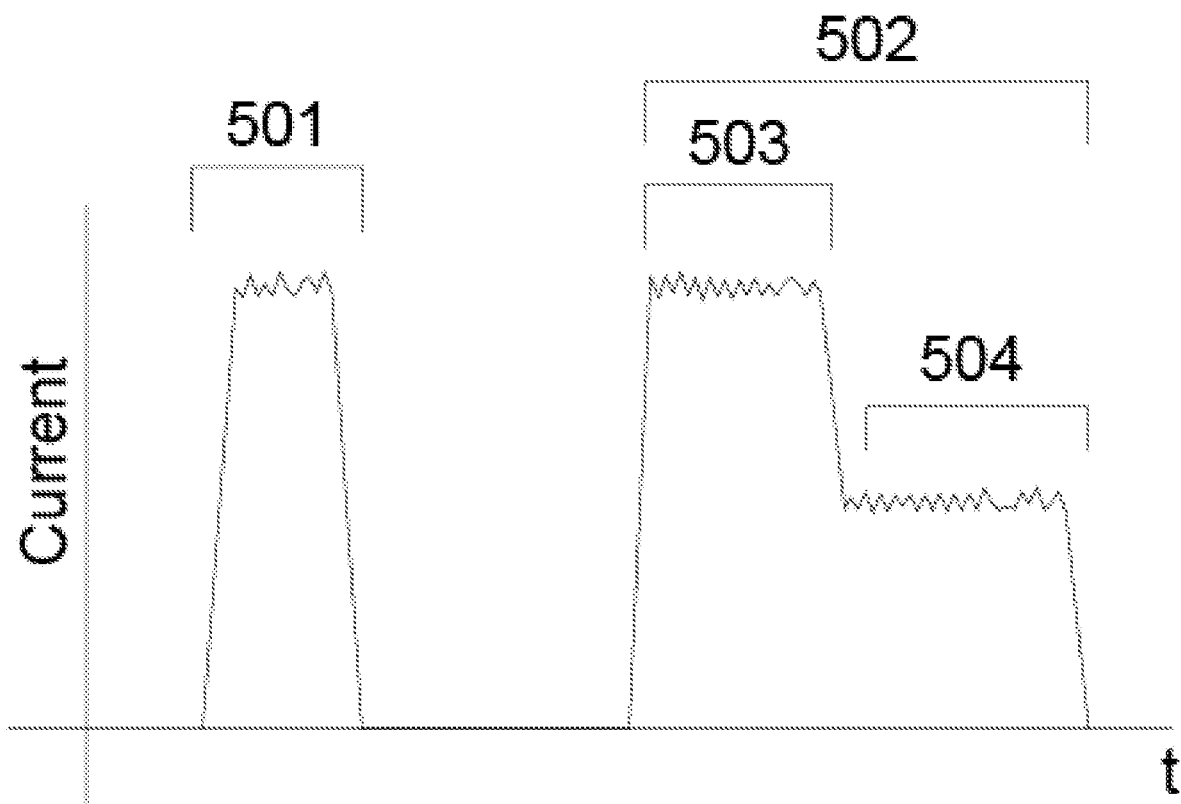
FIG. 5 shows a typical waveform of current over time, for a standard diesel injector solenoid.

FIG. 5 further shows a typical drive waveform of current over time, and consists of a short pulse, 501, referred to as a pilot injection; and a longer pulse, 502, referred to as a main injection. In the main injection, it is known in the art to utilize a "Peak and Hold" technique, wherein the initial part of each pulse section is driven to a relatively high level (the "Peak"), 503, to improve the effective injector opening time and thereafter the current is reduced (the "Hold"), 504, to maintain the injector in an open state. In some scenarios, the pilot injection period and/or the main injection are too short for the driver to reach the Hold portion of the pulse and no "Hold" time is implemented.

In an exemplary diesel, single fuel, injection system; the amount of fuel delivered through the diesel injector for a particular cylinders' power cycle is the sum of the fuel delivered during the pilot and main injections. Generally this fuel delivery is not directly proportional to the graphed pulse widths, which correlates time duration of the pulse, due to various effects including fuel supply (rail) pressure, injector delay in fully opening, the inertial and fluid resistance to developing of the flow through the injector orifices following injector opening, delay time in the full closing of the injector, and the collapse of flow effects as the injector closes, along with other electro-mechanical and fluid dynamic effects that occur. However, these effects can be relatively well measured and characterized, all for a variety of engine operating conditions, and for a given injector configuration and fuel rail pressure, hence models can be created and calculations performed to relate the true amount of fuel that is delivered to the corresponding pilot and main injection actuator drive pulse shapes.

On a cylinder-to-cylinder and rotation-to-rotation basis, a portion of a particular diesel injector open period is squelched or truncated so that a known portion of the diesel fuel the OEM ECM intended to supply to the cylinder can be prevented from being delivered to the cylinder. In the example below, the squelching is given in terms of truncating the end of the signal. However, the start of the signal may also be truncated, or both the beginning and the end of the signal may be truncated in order to achieve the desired amount of fuel being injected. This requires manipulating the diesel injector drive and feedback signals in a fashion such that the OEM ECM is not affected or alerted.

This squelching action is carried out on a solenoid style injector by implementing a circuit with an interrupting opening switch in the injector solenoid coil current path, and in parallel with the injector solenoid and the opening switch, a closing switch and dummy load that can effectively bypass the OEM ECM drive current pulse through the dummy load and around the injector solenoid portion of the circuit. As used herein. "dummy load" means a resistive component, with a resistance chosen to mimic the resistance normally present in the circuit created between the OEM ECU and the open injector solenoid, which advantageously masks the closing of the injector solenoid from the OEM ECU and prevents error codes being generated by the OEM ECU by reason of changes in current flow, resistance, or voltages in the circuit.

Careful commutation of the opening and closing switch results in the OEM fuel injector current being turned "off" earlier than the OEM ECM intended, reducing the amount of diesel fuel being injected. However the rerouting of the OEM ECM injector actuator drive signal through the dummy load bypass, allows the OEM ECU to produce its desired actuator drive current pulses as the OEM ECU originally deemed appropriate for that injection cycle. Proper matching of the dummy load characteristics and the respective opening and closing of the commutation switches is required to effect a clean transfer of the injector drive current to the dummy load at the time intended by the CFC so that the desired diesel fuel fraction is omitted without introducing drive signal artifacts that the OEM ECU might detect as potential problems or faults.

In one example, a pair of magnetically coupled power MOSFET transistors are used for the "Normally On" and "Normally Closed" switch on each channel. In the case of the "Normally On" switch the power MOSFET is an enhancement mode type, whereas for the "Normally Closed" switch the power MOSFET is a depletion mode type. The use of these two types of power MOSFET transistors allows for a safe default "off" state for the CFC, such that the dummy load is effectively absent from the engine fuel injector circuit, while the OEM fuel injector remains effectively connected, all as the OEM ECM is designed for. Only after the CFC energizes, and actively takes over operation of the pairs of "Normally Closed-Normally Open" switches; and is then able to switch out the diesel injectors and connect the dummy loads contemporaneously. This is an important feature for a practical system as it allows the engine to assume relatively normal operation if the CFC is offline. The magnetic isolation also provides a useful layer of galvanic isolation between the floating injector drive circuits and the chassis ground referenced CFC electronics that would be used on most commercial engines.

A solenoid actuated injector is intended as a non-limiting example, and alternative techniques suitable for reducing fuel flow through other injector types are contemplated. Further, current pulse width truncation schemes are intended to be non-limiting examples and alternative mechanisms for suppression of diesel fuel injection with injector designs are known in the art and can benefit from a circuit presented herein so long as the injectors activity correlates to a voltage or current provided therein. By way of illustrative example, piezoelectric actuated injectors would notionally require that the voltage excitation driving the piezoelectric elements would need to be altered, so as to reduce the net fuel delivered during an injection event; whereas in the case of a proportional flow injector, the amplitude or wave-shape of the driving signal would need to be modified to reduce the fuel flow during some or all of the OEM ECM commanded injection event. It is contemplated that a circuit as described herein may provide advantages to alteration of the injection events, and one skilled in the art would be capable of modifying the illustrative circuit provided for herein.

Figure 2:
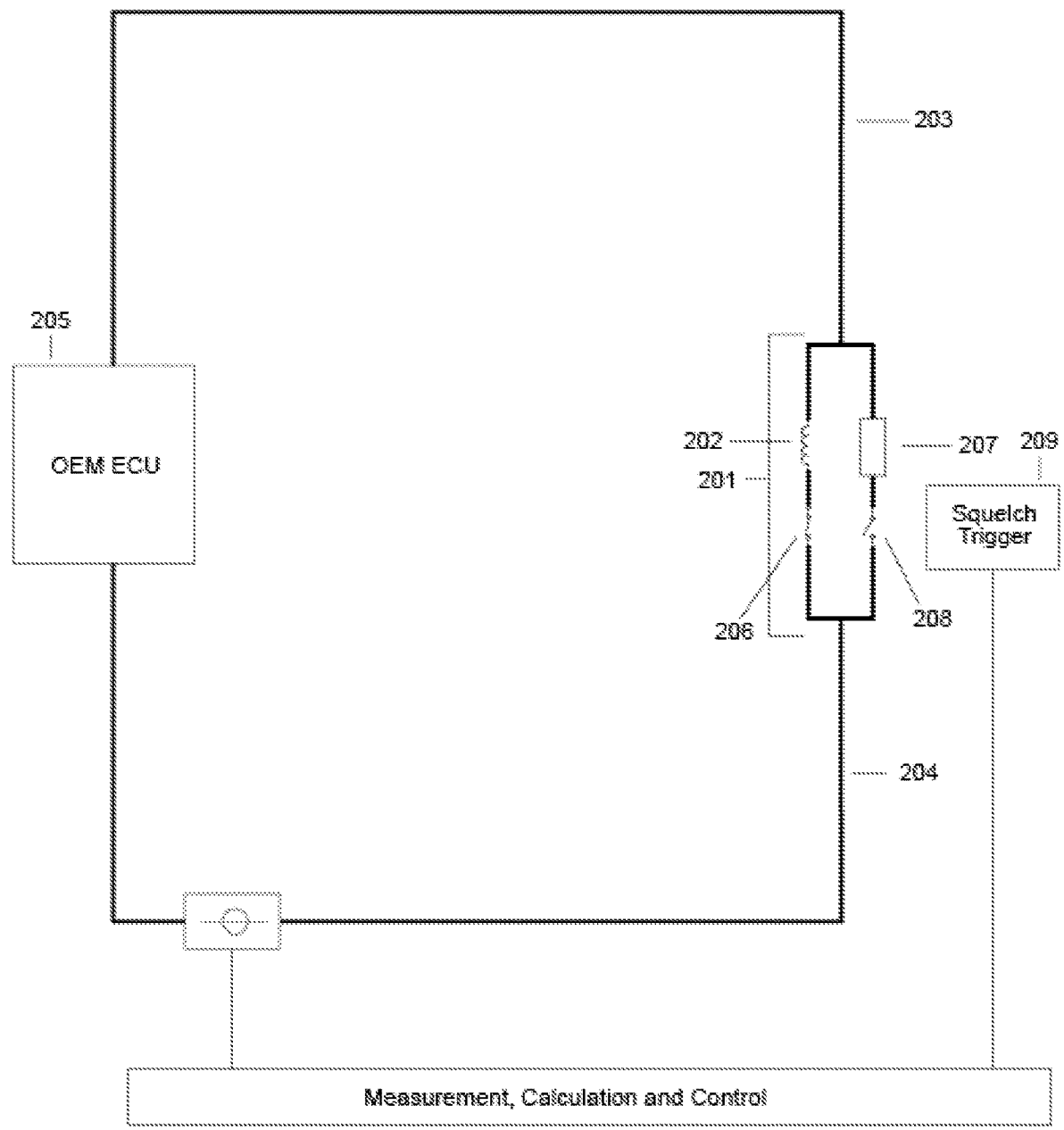
FIG. 2 shows a schematic of a circuit in place within a diesel engine injector solenoid control system.

FIG. 2 shows one example of how the normal equipment configuration for 100% diesel injection can be modified for co-fueling. Each injector connection 201, comprising wire 203 in electrical communication with a high side driver, a injector solenoid 202, and wire 204 in electrical communication with a low-side driver, is modified such that the branch connected to the OEM ECM 205 is equipped with a normally closed switch 206 in series with the injector solenoid (shown in FIG. 2, for convenience, as an injector solenoid driven actuator). In parallel with the solenoid injector and its normally closed switch 206, is a resistive element or "dummy load" 207, and a second switch 208 in series with dummy load 207 and connected to in a normally open configuration. The normally open and normally closed switches are arranged to be commutated by the same trigger signal provided by electronic device 209 which forms part of the CFC, such that switches 206 and 208 are oppositely open and close at effectively the same time. These features and functions are all in electrical communication with the CFC and its accessory modules.

The OEM ECM 205 operates the high-side driver (not shown) and low-side sink (not shown) as intended by the OEM and as encoded in the ECM firmware, measuring and modulating the signal as usual. The CFC may be configured to receive as input, values generated through measurement of pulses generated by the OEM ECM, by way of non-limiting example by detecting the operating current generated by the high-side driver, so as to detect the OEM pulse timing and convert the timing into quantities of fuel that were intended to be injected. Using models provided to the CFC for the particular given engine the CFC shall be installed in, it is possible to determine, in real time, the instant start and stop times of the OEM pilot and main injections, and thereby measure the intended fuel volume to be provided to the cylinder by reference to diesel fuel rail pressure, fuel viscosity, fuel temperature, and maximum aperture opening size from the diesel fuel rail into the cylinder. Devices and methods for the calculation of intended fuel injection into the cylinder are well known in the art, see for example U.S. Pat. No. 8,463,528.

In the case of the pilot phase, the CFC detects the intended injector opening and closing times provided by OEM ECM 205, for fuel calculation purposes. In the case of the main pulse, the CFC detects the intended opening and closing times, again for fuel calculation purposes; but further to determine the correct timing for initiating operation of electronic device 209 to bypass a portion of the drive signal through dummy load 207 such that the injector solenoid closes earlier than the OEM ECM intended, and a portion of the intended diesel fuel is prevented from being injected into the affected cylinder.

Further to this arrangement, the synchronous commutation of the diesel injector solenoid 202 and dummy load 207 via their respective series connected switches 206 and 208, provides for a relatively seamless driver signal transition from the injector solenoid to the dummy load (referred too herein as a "squelched" injection, or "squelching" of a diesel injection operation), such that the OEM ECM does not detect any significant disturbance, operates absent substantial detection of abnormal operating conditions. This allows the OEM ECU to continue to act as if the engine were operating under a single, normal, fuel, such as diesel.

Figure 4:
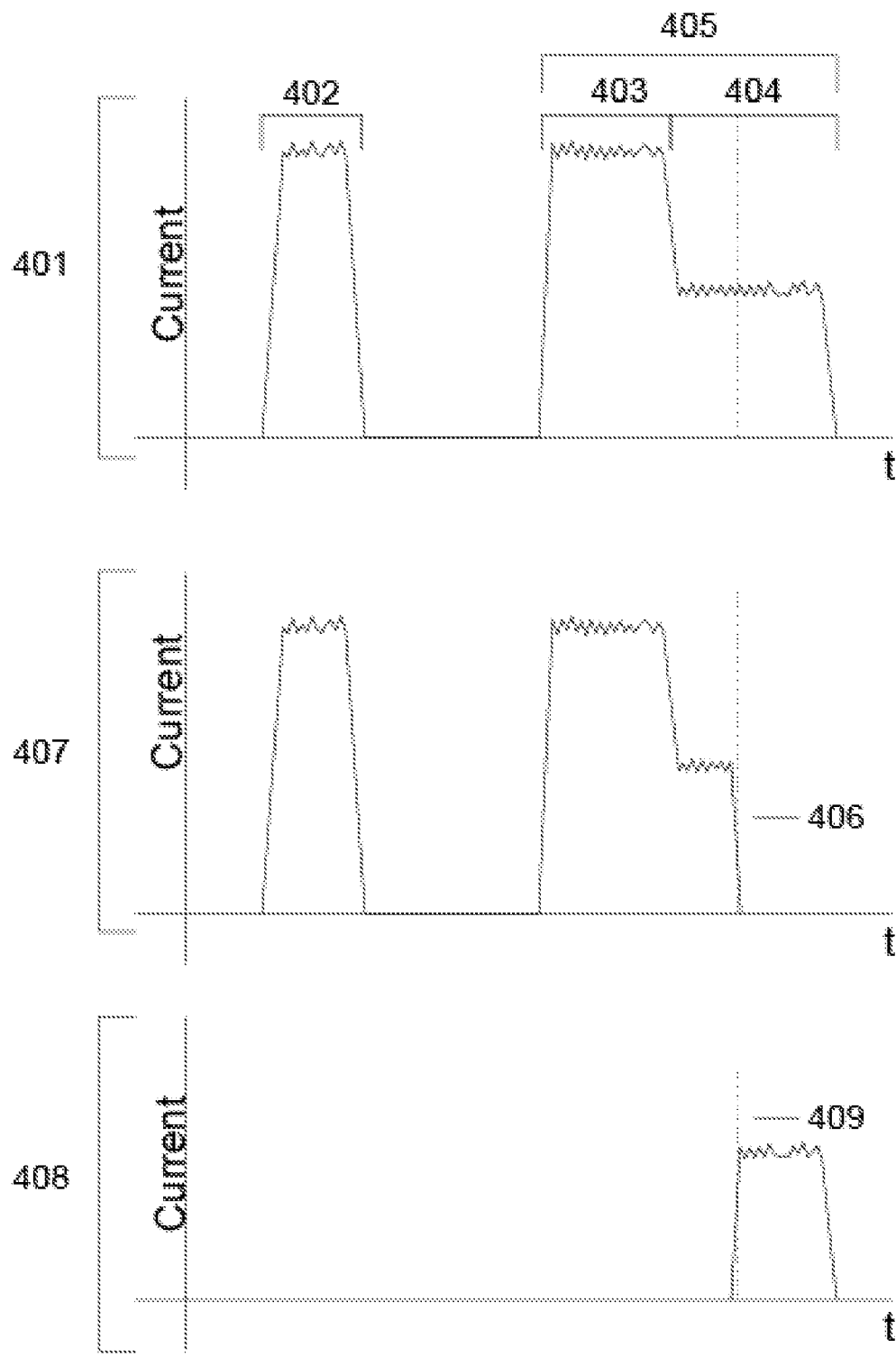
FIG. 4 shows a waveform of current over time, for a diesel injector solenoid circuit.

FIG. 4 shows a waveform of current against time for a diesel injector solenoid comprising a circuit without an squelching of the diesel injection 401, comprising a pilot injection phase 402, followed by a main phase injection 405, itself comprised of a peak phase, 403, and a hold phase, 404. Waveforms 407 (representing the injector solenoid) and 408 (representing the dummy load) show the effect of triggering of the normally open and normally closed switches 208 and 209 respectively (as shown in FIG. 2), which directs all current from the injector solenoid to the dummy load, squelching of the injector solenoid opening time by removal of all current, by way of representative example, during the hold phase at time 403, causing a drop of current, 406, to the injector solenoid, and a corresponding increase of current, 409, to the dummy load; resulting in a reduction of diesel provided to the cylinder.

Such transition of fuel injection from 100% diesel to partial diesel and secondary fuel, must be done contemporaneous with the operation of the cylinder intake, exhaust and power cycle; as the OEM ECM constantly adjusts the start and stop times of the pilot and main injections on a rotation-to-rotation, and optionally on a cylinder-to-cylinder basis, as part of the control of the engine speed and power according to its own engine control feedback and control algorithms.

A combustible hydrocarbon gas such as CNG may be used as a second fuel and injected into the air intakes adjacent to each cylinder (the intake runners) using appropriate supply plumbing and injector valves; such as CNG supply plumbing and CNG injector valves. The amount of CNG that needs to be delivered to each cylinder, in substitution of the diesel fuel removed, is managed by the CFC to be as close as possible to replacing the fuel energy that will be omitted from a particular cylinder when its diesel injection is squelched by the CFC activating the circuit discussed herein. Gas injection can be carried out either at relatively low pressures (for example, 5-30 Bar) compressed natural gas, by controlling the delivery of gas into the intake runners prior to and during a particular cylinders intake stroke, or by high pressure injection (for example, 5-1000 Bar) Liquid Natural Gas directly into the cylinder timed to properly overlap the remainder of the diesel injection. Low pressure injection would typically be coordinated and timed based upon the CFC's knowledge of the of the engine speed and angular position combined with the amount of diesel fuel that would be squelched, such that some of the gaseous secondary fuel would need to be injected in advance of the associated cylinder intake valve opening. On the same co-fueling injection event, subsequent to the cylinder intake valve opening, additional gas may be injected during the duration of the cylinder intake stroke such that when the intake valves close the proper amount of CNG would be present to offset the amount of diesel that was squelched.

Gaseous secondary fuel injection timing may require further modification to accommodate variations in gas supply pressure, gas temperature and gas formulation. In the case of CNG, it is contemplated that the formulation varies depending on time of year, gas supplier, and geographical location; and therefore a correction factor for the heat of combustion is contemplated as appropriate.

For many practical reasons lower pressure gas injection is often preferred due to the reduced complexity of plumbing. This however is not necessary, nor should be seen to limit the application of the additional secondary, or co-fueling, process identified herein. Direct high-pressure gas injection or liquid natural gas injection are also contemplated as potential methods to deliver suitable amounts of secondary fuel to the cylinder.

Figure 3:
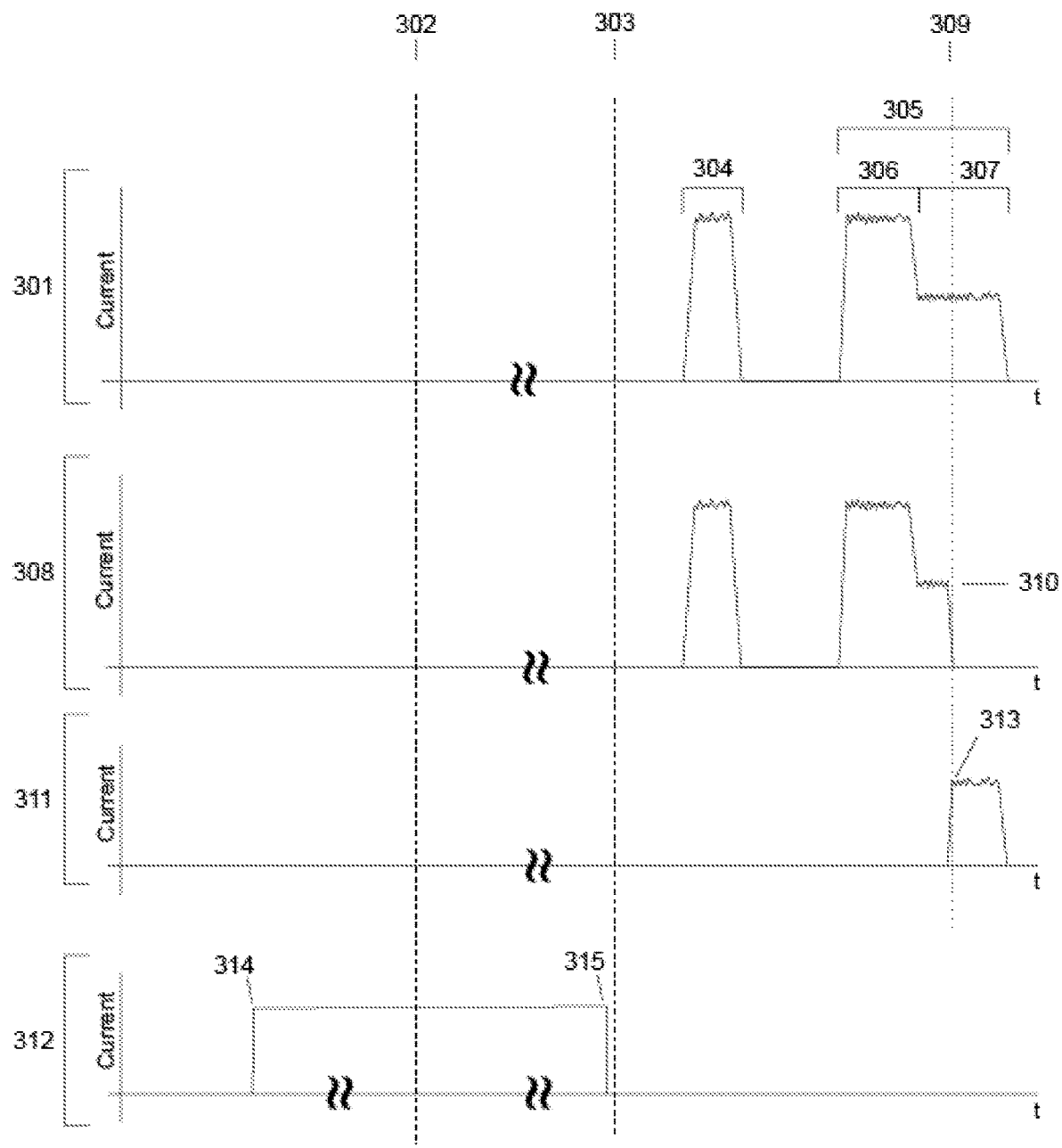
FIG. 3 shows a schematic of the typical current flow in an injector solenoid, with and without co-fueling with a secondary fuel such as CNG.

FIG. 3 provides a representation of CFC coordination of secondary fuel injection (by way of non-limiting example, CNG) and the timing with respect to the pilot and main injection drive pulses for a given cylinder; such that the CFC compensates for the amount of diesel injection during co-fueling operation. 301 shows the current graphed against time for an injector solenoid providing for injection of diesel fuel into the cylinder. Intake valve opening event 302 and intake valve closing event 303. Current flows into the injector solenoid, under the control of the OEM ECM, providing a pilot injection phase 304, and main injection phase 305, with the main injection phase 305 typically comprising a peak phase 306 and hold phase 307.

308 provides a representation of the effect of the circuit on current over time, and 311 provides a representation of the current over time received by the dummy load comprising a circuit as discussed herein. Triggering of the normally open and normally closed switches 208 and 209 respectively (as shown in FIG. 2), directs all current from the injector solenoid to the dummy load 207, squelching of the injector solenoid opening time by removal of all current, by way of representative example, during the hold phase at time 309, causing a drop of current, 310, to the injector solenoid, and a corresponding increase of current, 313, to the dummy load; resulting in a reduction of diesel provided to the cylinder.

The flow of secondary gaseous fuel, for example CNG, delivered into a particular cylinder to provide the substitution sufficient to maintain equivalent energy production during the combustion phase of a "power" stroke in the normal engine operation cycle, must initiate prior to the cylinder's completion of diesel injection, even if it is squelched. It is observed that the substitution of the secondary gaseous fuel for that cylinder must be aspirated into the cylinder during the intake stroke for that cylinder, and before the associated diesel injector actuator drive signal measurements are available. Therefore, it is contemplated that the decision for injection and introduction of a volume of secondary fuel (for example, CNG) may be made based upon measurements and engine state values from the preceding operation cycle of the cylinder, or alternatively the operation cycle of a cylinder preceding it in cylinder firing order. 312 provides a representation of current over time of the initiation of the secondary gaseous fuel injection, where current is applied to the gaseous injector at time 314, ending at time 315; with time 315 contemplated to occur prior to, contemporaneous with, or following initiation of diesel injection, for example the pilot injection phase 304.

In an aftermarket retrofit scenario, this limits the CFC to using measurements made on a prior cylinder's diesel injection for the purposes of calculating the volume of secondary fuel (representing a combustion energy) to be added in replacement of the squelched diesel injection (representing a lost combustion energy), for a subsequent cylinder's secondary fuel injection prior to its intake stroke; all to give rise to a combustion energy in the power stroke substantially similar. In some cases, the prior cylinder measurements may be based on the diesel injection measurements made on the same cylinder on a previous engine rotation, or alternately on the diesel injection measurements on other cylinders within a time frame consistent with the same crankshaft rotation period, or alternately on combinations of the same and other cylinders diesel injection measurements over single or multiple crankshaft rotations. The measurement sources and strategies to blend measurement data from each cylinder, and over time, that are used to determine the secondary fuel injection substitution requirement for a particular cylinder, are application specific since different engine configurations, engine loading dynamics and diesel injector configurations have an impact on the cylinder-to-cylinder and rotation-to-rotation consistency of the OEM ECM diesel injector actuator drive signals.

In one non-limiting embodiment, the secondary fuel substitution for a particular cylinder intake stroke is based on the diesel injection drive signal measurements made on another cylinder that fired less than a single crankshaft rotation prior to the current cylinder being co-fueled. Measurement data derived from another cylinder within a single crankshaft rotation period is a reasonable surrogate for most practical applications, as large diesel engines slow and speed up slowly compared to gasoline engines, and thus the co-fueling requirements changes relatively slowly as well. Alternatively, it is contemplated that measurement and use of the diesel injection parameters from the immediately preceding cylinder may be used to determine the magnitude of the diesel squelch and secondary fuel substitution for a given cylinder, which would give the most timely data possible in this general retrofit configuration.

In a situation where CFC functionality was incorporated into a single ECM, the intended diesel injector actuator drive values for a particular cylinder would be known in advance of the particular cylinder being fueled with diesel that the secondary fuel, such as CNG, could be delivered using the control data that was also going to determine the diesel amount for that cylinder cycle. In that situation the need to use prior cylinder measurements to predict the ideal amount of secondary fuel to inject could be avoided. The apparatus, system and circuit discussed herein contemplates an arrangement with the CFC functionality integrated in a single ECM, the secondary fuel calculations would take advantage of this more timely fuel injection data.

As with conventional CI engines, accurate instant knowledge of the crankshaft, cam and piston positions within the engine operating cycle is necessary to properly coordinate the effective delivery of fuel both to the fuel supply rails and to the injectors. In the present case of co-fueling, this remains vital information both to carry out the secondary gaseous fuel injection, but also to gate and synchronize various process measurements and other fuel control operations. Typical engines are equipped with sensors on the cam and crank shafts that are processed to generate fiducial signals coordinated to the cam and crank angles. In one example, these are passively monitored by the CFC to allow it to keep track of the engine rotation in terms of the crankshaft angle, angular velocity and angular acceleration. As previously described herein, multiple cam and crank position detectors are known in the art, including inductive sensors, Hall Effect sensors, magnetoresistive sensor, optical sensors and galvanic sensors; all of which are contemplated as compatible with the system, apparatus and circuit discussed herein.

In typical OEM ECM controlled diesel engines, the high-pressure fuel rail feeding the fuel injectors is monitored for pressure and associated with, or coincident with a fuel injection event, in which a compensating amount of new fuel is administered into the fuel rail to maintain a comparatively constant pressure. In some engines the compensating amount of fuel is calculated based upon the anticipated amount of cylinder injection volume, such that the inflow and outflow from the fuel rail is substantially balanced over time, thereby maintaining, in average, the fuel pressure within the fuel rail.

Therefore, given that the co-fueling process described herein has the effect of reducing the amount of diesel delivered to each cylinder, at rates dependent upon engine condition and the desired substitution ratio, the amount of fuel leaving the fuel rail may be reduced from that anticipated by the OEM ECM. In many diesel engine systems, administration of the fuel into the fuel rail (a "fuel top up") is coordinated with the expected reduction of fuel through injection into the cylinders; which absent intervention would give rise to administration of more fuel to the fuel rail than being injected into the cylinder which can result in an increase in fuel rail pressure. If left uncorrected, the fuel top up action provided by the engine fuel pumps would result in the fuel rail pressure building to much higher levels than the OEM ECM expected. In turn, this would typically lead to diagnostic test failures and engine error codes presented to the vehicle operator indicating a problem with the fuel system.

To address this, a circuit as discussed herein may be introduced into the electrical communication between the OEM ECM and the fuel pump to periodically divert current from the relevant fuel rail pump system to the dummy load. The circuit is similar to that presented in FIG. 2, with the replacement of the injector solenoid 202 with the appropriate element of the fuel rail pump system, such as an injection pump solenoid for introduction of additional fuel into the fuel rail where current for a full pump action for introduction of fuel into the fuel rail is directed to the dummy load, referred to as a "kill". In an alternative embodiment, an additional solenoid can be introduced following into the fuel line, between the pump and the fuel rail, which is used to redirect the fuel volume intended for the fuel rail into a fuel dump conduit back to the diesel fuel reservoir. Due to the pressures and nature of the fuel pump associated with introduction of additional fuel to the fuel rail, interruption of the injection event, once initiated, is not preferable. Instead, the entire injection operation is prevented or directed to a dummy load, or alternatively to the diesel fuel reservoir; the choice of which is dependent upon the system, in place, in the diesel engine.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the examples set forth above and in the drawings, but should be given the broadest interpretation consistent with the description as a whole.

What is claimed is:

1. A mixed-fuel control circuit comprising:
   an engine control unit that generates an injection signal and a fuel pump signal;
   a fuel pump in fluid communication with a primary fuel source and a primary fuel rail, the fuel pump delivering fuel from the primary fuel source to the primary fuel rail in response to a received pump signal from the engine control unit;
   a fuel injector in fluid communication with the primary fuel rail and a combustion engine, the fuel injector injecting fuel from the primary fuel rail into the combustion engine in response to a received injection signal; and
   a mixed-fuel control unit comprising:
      injector switches that selectively connect the engine control unit to a first sub-circuit and a second sub-circuit, the first sub-circuit comprising the fuel injector and a second sub-circuit comprising a dummy load; and
      pump switches that control an amount of fuel that is delivered from the primary fuel source to the primary fuel rail;
   wherein the mixed-fuel control unit is configured to:
      switch between the first sub-circuit and the second sub-circuit such that a squelched portion of the injection signal is conducted through the second sub-circuit instead of the first sub-circuit and the received injection signal comprises a non-squelched portion of the injection signal; and
      control the pump switches to reduce the amount of fuel that is delivered from the primary fuel source to the primary fuel rail based on the squelched portion of the received injection signal.

2. The mixed-fuel control circuit of claim 1, wherein the squelched portion of the injection signal is an end portion of the injection signal.

3. The mixed-fuel control circuit of claim 1, wherein the mixed-fuel control unit comprises a normally-closed switch connected between the engine control unit and the fuel injector, and a normally-open switch connected between the engine control unit and the dummy load, and wherein switching between the first sub-circuit and the second sub-circuit comprises:
   opening the normally-closed switch; and
   closing the normally-open switch.

4. The mixed-fuel control circuit of claim 1, wherein a total resistance in the first sub-circuit matches a total resistance in the second sub-circuit.

5. The mixed-fuel control circuit of claim 1, further comprising a secondary fuel injector connected to a secondary fuel source, the mixed-fuel control unit causing the secondary fuel injector to inject an energy-equivalent amount of a secondary fuel based on the squelched portion of the injection signal.

6. The mixed-fuel control circuit of claim 5, wherein the mixed-fuel control unit is programmed to calculate the energy-equivalent amount of the secondary fuel based on an intended injector opening time and closing time, and a duration of the squelched portion of the injection signal.

7. A method of controlling delivery of fuel to a mixed-fuel engine, the mixed-fuel engine comprising an engine control unit, a fuel injector that injects fuel from a primary fuel rail into the mixed-fuel engine in response to a received injection signal from the engine control unit, and a mixed-fuel control unit comprising a first sub-circuit comprising the fuel injector and a second sub-circuit comprising a dummy load, the method comprising the steps of:
   controlling an amount of primary fuel injected into the mixed-fuel engine from the primary fuel rail by switching between the first sub-circuit and the second sub-circuit such that a squelched portion of the received injection signal is conducted through the second sub-circuit instead of the first sub-circuit, the received injection signal comprises a non-squelched portion of the injection signal; and
   maintaining a primary fuel rail pressure by reducing the amount of primary fuel delivered to the primary fuel rail from a primary fuel source based on the squelched portion of the received injection signal.

8. The method of claim 7, wherein the squelched portion of the injection signal is an end portion of the injection signal.

9. The method of claim 7, wherein switching between the first sub-circuit and the second sub-circuit comprises:
   opening a normally-closed switch connected between the engine control unit and the fuel injector; and
   closing a normally-open switch connected between the engine control unit and the dummy load.

10. The method of claim 7, wherein a total resistance in the first sub-circuit matches a total resistance in the second sub-circuit.

11. The method of claim 7, further comprising a step of causing a secondary fuel injector to inject an energy-equivalent amount of a secondary fuel into the mixed-fuel engine based on the squelched portion of the injection spinal.

12. A method of converting an engine to a mixed-fuel engine, the engine comprising an engine control unit that generates an injection signal and an injector that injects fuel from a primary fuel rail into the engine in response to a received injection signal, the method comprising the steps of:
- connecting the engine control unit to a first sub-circuit that comprises an injector and a second sub-circuit that comprises a dummy load, the dummy load being connected in parallel with the injector;
- providing a mixed-fuel controller that:
  - controls an amount of primary fuel injected into the mixed-fuel engine from a primary fuel rail by switching between the first sub-circuit and the second sub-circuit such that a squelched portion of the injection signal is conducted through the second sub-circuit instead of the first sub-circuit, the received injection signal comprises a non-squelched portion of the injection signal; and
  - reduces an amount of primary fuel delivered to the primary fuel rail from the primary fuel source based on the squelched portion of the injection signal.

13. The method of claim 12, wherein the squelched portion of the injection signal is an end portion of the injection signal.

14. The method of claim 12, wherein the first sub-circuit is connected to the engine control unit by a normally-closed switch and the second sub-circuit is connected to the engine control unit by a normally-open switch, and wherein the mixed-fuel controller switches between the first sub-circuit and the second sub-circuit by:
- opening the normally-closed switch; and
- closing the normally-open switch.

15. The method of claim 12, wherein a total resistance in the first sub-circuit matches a total resistance in the second sub-circuit.

16. The method of claim 12, further comprising a secondary fuel injector connected to a secondary fuel source, the mixed-fuel controller causing the secondary fuel injector to inject an energy-equivalent amount of a secondary fuel based on the squelched portion of the injection signal.

17. The method of claim 12, wherein the mixed-fuel control unit is programmed to calculate the energy-equivalent amount of the secondary fuel based on an intended injector opening time and closing time, and a duration of the squelched portion of the injection signal.

18. The mixed-fuel control circuit of claim 1, wherein the mixed-fuel control unit is configured to control the pump switches to kill a full pump action of the fuel pump.

19. The mixed-fuel control circuit of claim 18, wherein the mixed-fuel control unit is configured to switch the received pump signal corresponding to the killed full pump action to a dummy load.

20. The method of claim 7, wherein reducing the amount of primary fuel delivered to the primary fuel rail comprises killing a full pump action of the fuel pump.

21. The method of claim 20, wherein killing the full pump action comprises switching a corresponding portion of a fuel pump signal to a dummy load.

22. The method of claim 12, wherein reducing the amount of primary fuel delivered to the primary fuel rail comprises killing a full pump action of the fuel pump.

23. The method of claim 22, wherein killing the full pump action comprises switching a corresponding portion of a fuel pump signal to a dummy load.

* * * * *